United States Patent [19]
Fuji et al.

[11] Patent Number: 4,910,479
[45] Date of Patent: Mar. 20, 1990

[54] AUTOMATIC GAIN CONTROL DEVICE FOR USE IN AN OPTICAL MEMORY DEVICE

[75] Inventors: Hiroshi Fuji, Nara; Shigemi Maeda, Yamatokoriyama; Takeshi Yamaguchi, Nara; Kunio Kojima, Nara; Toshihisa Deguchi, Nara; Shigeo Terashima, Tenri, all of Japan

[73] Assignee: Sharp Kabushiki Kaisha, Osaka, Japan

[21] Appl. No.: 299,013

[22] Filed: Jan. 19, 1989

[30] Foreign Application Priority Data

Jan. 22, 1988 [JP] Japan ................................. 63-13195

[51] Int. Cl.$^4$ ............................................. H03G 3/10
[52] U.S. Cl. .................................... 330/279; 330/281
[58] Field of Search ...................... 307/264, 353, 359; 330/129, 141, 279, 280, 281, 285

[56] References Cited

U.S. PATENT DOCUMENTS 3,770,984 11/1973 Connor et al. ................. 330/141 X
4,292,598 9/1981 Yasumura ........................... 330/281

FOREIGN PATENT DOCUMENTS 60-253066 6/1986 Japan .
61-137286 11/1986 Japan .
61-158079 12/1986 Japan .
61-233473 3/1987 Japan .

Primary Examiner—Steven Mottola
Attorney, Agent, or Firm—Birch, Stewart, Kolasch & Birch

[57] ABSTRACT

An automatic gain control device for use in an optical memory device has a circuit for producing an amplification control signal which is fed back to a gain control amplifier through a sample-hold circuit. A pulse train detection circuit is provided for detecting the pulse train indicating that the data stored are a on the optical memory device is being playedback. When the pulse train is detected, the sample-hold circuit is made inactive so that the amplification control signal is directly fed back to the gain control amplifier, and when the pulse train ends, the sample-hold circuit is made active to hold the amplification control signal obtained at the end of the pulse train and to produce the amplification control signal held in the sample-hold circuit.

10 Claims, 3 Drawing Sheets

AUTOMATIC GAIN CONTROL DEVICE FOR USE IN AN OPTICAL MEMORY DEVICE

BACKGROUND OF THE INVENTION

1. Field of the Invention

The present invention relates to an automatic gain control device which controls the playback signal level in optical memory devices which record, playback, and erase information by irradiating an optical data storage medium with a light beam.

2. Description of the Prior Art

Examples of conventional optical memory devices include a magneto-optical memory device which records information on a magneto-optical disk. The magneto-optical disk used in the aforementioned magneto-optical memory device is formed with a magnetic thin film with an axis of easy magnetization in a direction perpendicular to the film surface, enabling information to be recorded according to the magnetic orientation in minute ranges.

When recording information on magneto-optical disks of this type, the magnetic thin film is irradiated with a focused laser beam with a diameter of, for example, approximately 1 micrometer. Thus, the temperature of that part of the thin film irradiated by the laser beam rises locally, and the magnetic orientation of the film becomes more easily changed. At this point, it is possible to record and erase information by simultaneously applying an external magnetic field to change the magnetic orientation to the desired orientation.

Furthermore, when information recorded in the aforementioned manner is played back, the magnetic film is irradiated with a laser beam of a strength which will not cause the temperature to rise. Thus, the plane of polarization of the linear polarized light in the transmitted light and reflected light of the laser beam incident upon the magnetic thin film is rotated by the Faraday effect and the Kerr effect. Therefore, by wave-detecting this transmitted light and reflected light using an analyzer, and converting the light to electrical signals, a pulse-type playback signal is obtained.

Normally, the signal level of this playback signal has a tendency to fluctuate due to variations in the playback conditions. Therefore, in a conventional optical memory device, an automatic gain control device is provided so as to control the level of the playback signal at a constant level.

In FIG. 4, a conventional automatic gain control device 10 in the aforementioned optical memory device is shown, which includes a gain control amplifier 11 in which the amplification varies based on the amplification control signal ACS. Also provided are a signal level detection circuit 12 which outputs a voltage according to the level of the signal outputted by gain control amplifier 11, and an operational amplifier 13 which compares the difference between the output signal level of gain control amplifier 11 detected by this signal level detection circuit 12 and a predetermined reference signal level from a reference signal generator 13'. Operational amplifier 13 outputs the amplification control signal ACS, which is fedback to gain control amplifier 11 thereby maintaining the playback signal at a constant level.

Data is not necessarily stored across the entire range to which recording is possible on the optical data storage medium, and it is possible that there are wide areas to which data is not recorded.

Thus, when the playback position is at a place on the magneto-optical disk where data is not recorded, the automatic gain control device 10 tries to respond to a LOW playback signal containing no pulse signal such that the amplification of gain control amplifier 11 becomes excessively great. In this case, when the playback position enters an area to which data is recorded on the magneto-optical disk, amplification is not able to immediately track the playback signal level when the playback signal containing the pulse signals is applied to gain control amplifier 11.

Moreover, as shown in FIG. 5, immediately after the playback signal S1 containing the pulse signal is inputted, the output signal S2 of gain control amplifier 11 is significantly increased. In addition, a normal playback signal cannot be obtained for a certain period of time until the amplification tracks the playback signal level and attains a suitable amplification level.

Furthermore, if scratches or foreign matter are present on the surface of the optical data storage medium, a defect pulse 14 as shown in FIG. 6 may be contained in the playback signal S1'. When automatic gain control device 10 responds to this defect pulse 14, the amplification of gain control amplifier 11 becomes very low. A significantly longer period is required for this low amplification to return to normal amplification than in the aforementioned case of excessive amplification.

As understood from the above, after the defect pulse 14' is generated, the output signal S2' of gain control amplifier 11 drops significantly, and it is, again, not possible to obtain a normal playback signal.

As thus described, in the prior art automatic gain control device 10 for an optical memory device, the amplification and playback signal level of gain control amplifier 11 have a tendency to vary significantly due to the influences of unrecorded data areas, scratches, or foreign material on the optical data storage medium, thereby creating errors in the playback data, and thus reducing reliability.

In order to solve the aforementioned problem, it is conceivable to, for example, prerecord a dummy signal at the beginning of the area to which data is recorded so as to provide a time allowance sufficient for the change in the amplification of automatic gain control device 10 to respond. But this to creates wasted recording area and invites an effective reduction in recording density and a reduction in recording and playback speeds.

SUMMARY OF THE INVENTION

The present invention has been developed with a to substantially solve the above described disadvantages and has for its essential object to provide an improved automatic gain control device for optical memory devices in which the output signal level of the gain control amplifier does not decrease significantly.

In accomplishing these and other objects, according to the present invention, an automatic gain control device for use in an optical memory device comprises a gain control amplifier for producing an amplified playback signal with an amplification of the gain control amplifier being changed based on an amplification control signal; a reference signal generator; an amplifier for producing a preparatory amplification control signal based on the difference in the level between the output signal of the gain control amplifier and the reference signal; a pulse train detection circuit for detecting a pulse train in the amplified playback signal which continues longer than a predetermined time and for producing a pulse train detection signal which starts after counting the predetermined time from the detection of a first pulse in the pulse train and ends after the detection of the last pulse in the pulse train; and a hold circuit for holding the preparatory amplification control signal at the end of the pulse train detection signal and for providing an amplification control signal to the gain control amplifier such that, during the absence of the pulse train detection signal, the preparatory amplification control signal held in the hold circuit is used as the amplification control signal, and during the presence of the pulse train detection signal, the current preparatory amplification control signal from the amplifier is used as the amplification control signal.

In operation, when the area having recorded data on the optical data storage medium is played back by the aforementioned construction, the operational amplifier is controlled in such a manner as to maintain the playback signal level of the information recorded on the optical data storage medium at a constant level by outputting an amplification control signal based on the difference between the output signal level of the gain control amplifier and a reference signal level and feeding back this amplification control signal to the gain control amplifier.

Moreover, when an area on the optical data storage medium having no recorded data is played back, a state in which the pulse continues for a specified period, and moreover a pulse train continuing for greater than a constant time, is not detected by the pulse train detection circuit in the playback signal because the playback signal has become a LOW signal.

Thus, the hold circuit holds the amplification control signal immediately before the pulse train becomes undetected according to the signal from the pulse train detection circuit, specifically, the last amplification control signal output when the area having recorded data on the optical data storage medium was being played back. In other words, because the amplification of the gain control amplifier is held constant, the automatic gain control device responds to the LOW playback signal contained in the pulse signal and the amplification of the gain control amplifier does not become excessive.

Moreover, because the output signal level of the gain control amplifier does not become excessive when the playback position is at an area having recorded data on the optical data storage medium, a normal level playback signal can be obtained.

Furthermore, in the case in which a defect pulse is contained in the playback signal due to a scratch on the surface or foreign material on the surface of the optical data storage medium, the existence of a state in which a pulse continues for a specific time, and moreover a pulse train continuing for greater than a constant period, is not detected by the pulse train detection circuit because such a defect pulse does not normally continue for longer than a constant period.

Therefore, the hold circuit holds the amplification control signal level regardless of the presence of a defect pulse or the level of the pulse. Specifically, even if a defect pulse is generated, the automatic gain control device responds to the defect pulse and the amplification of the gain control amplifier does not become excessively low.

Moreover, because the output signal level of the gain control amplifier does not decrease significantly, it is therefore possible to reliably obtain a playback signal of a normal level.

Therefore, it is possible to prevent significant variations in the playback signal level, the creation of errors in the playback information, and decreased reliability due to the influences of scratches and areas of unrecorded information on the optical data storage medium. Moreover, because it is not necessary to provide wasteful recorded areas, effective reductions in the recording density and recording and playback speed are not realized.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DETAILED DESCRIPTION OF THE PREFERRED EMBODIMENTS

Figure 1:
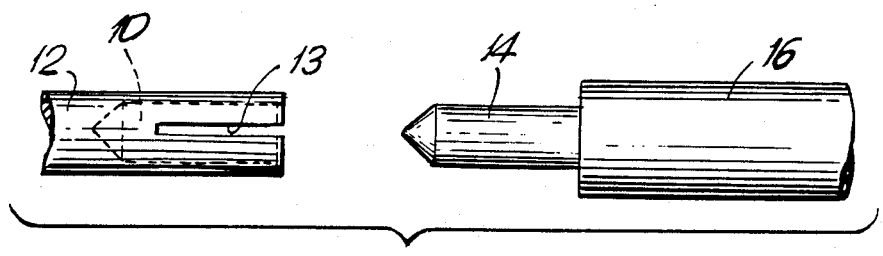
FIG. 1 shows block diagram of an automatic gain control device, according to the present invention.

Referring to FIG. 1, an automatic gain control device 20 according to the present invention is shown. Automatic gain control device 20 is provided with a gain control amplifier 21 in which the amplification varies based on the amplification control signal ACS'. The playback signal played back from an optical data storage medium such as a magneto-optical disk (not shown) is input through input terminal 22 to gain control amplifier 21.

The output signal of gain control amplifier 21 is output through output terminal 23 to the exterior, and at the same time, inputted to pulse train detection circuit 25, which detects a state in which the pulse continues for a specified period greater than a predetermined time length in the output signal of gain control amplifier 21, and also inputted to signal level detection circuit 24, which outputs a voltage signal according to the output signal level of gain control amplifier 21.

Signal level detection circuit 24 is connected to the inverting input of operational amplifier 27 through resistor 26. The inverting input of operational amplifier 27 is further connected to the output terminal of operational amplifier 27 through resistor 28. Furthermore, a predetermined reference signal obtained from a reference signal generator 27' is applied to the non-inverting input of operational amplifier 27. Thus, operational amplifier 27 produces an amplification control signal ACS which is proportional to the difference between the reference signal and the output signal of gain control amplifier 21 as detected by the aforementioned signal level detection circuit 24.

The output terminal of operational amplifier 27 is connected to hold circuit 29. During the detection of the pulse train by pulse train detection circuit 25, the signal ACS from operational amplifier 27 is passed through hold circuit 29 and directly fedback to gain control amplifier 21 as the amplification control signal ACS'. On the other hand, during no detection of the pulse train by the pulse train detection circuit 25, hold circuit 29 feeds back a latched signal to gain control amplifier 21 as the amplification control signal ACS', which is a amplification control signal ACS that has been obtained from operational amplifier 27 during the presence of the pulse train.

The pulse train detection circuit 25 and hold circuit 29 will be described in detail below in connection with FIG. 2.

Figure 2:
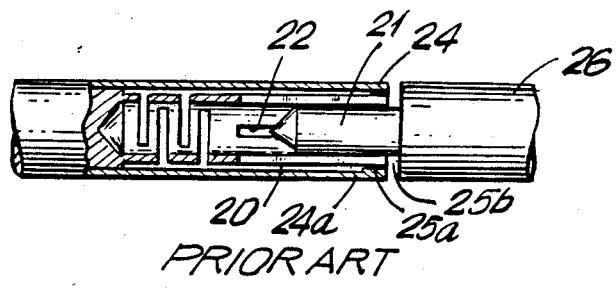
FIG. 2 is a block diagram showing a specific sample configuration of a pulse train detection circuit and a hold circuit shown in FIG. 1.

Referring to FIG. 2, pulse train detection circuit 25 includes a comparator 31 having a non-inverting input for receiving the output signal of gain control amplifier 21 and an inverting input for receiving a threshold V1 from a threshold generator 31'. Comparator 31 receives the output signal of gain control amplifier 21 and converts it to a binary signal by outputting a HIGH or LOW level signal when the output signal of gain control amplifier 21 is greater or less than the pulse discrimination threshold V1, respectively.

The output terminal of the aforementioned comparator 31 is connected to a trigger input terminal of a one-shot multivibrator 32, which is triggered by the step up of the output signal from comparator 31 and generates a negative logic pulse signal having a pulse width T1 determined by the time constant defined by resistor 33 and capacitor 34. Furthermore, one-shot multivibrator 32 is so arranged as to continuously produce the LOW level signal when the next trigger signal is inputted within the pulse holding period T1 until time constant T1 passes from the time the following trigger signal is input.

Pulse train detection circuit 25 further includes a timer 35 having its reset terminal connected to the output terminal of one-shot multivibrator 32 and its output connected to hold circuit 29. Timer circuit 35 starts to count in response to the LOW level signal applied to the reset terminal, and produces a HIGH level signal when it has counted greater than a predetermined time length T2, and thereafter, produces a LOW level signal in response to a HIGH level signal applied to the reset terminal.

Hold circuit 29 includes an analog/digital converter 36 which has an input Ain for receiving signal ACS from operational amplifier 27 and has eight parallel outputs for producing a digital signal and a digital-/analog converter 37 which has eight inputs for receiving the digital signal from A/D converter 36 and an output Aout for producing an analog amplification control signal ACS' which is applied to gain control amplifier 21. D/A converter 37 further has a CNT input for receiving the output signal from timer 35. A/D converter 36 and D/A converter 37 are operated in a synchronism by clock pulses produced from oscillator OSC.

Thus, when A/D converter 36 receives the analog form amplification control signal ACS from operational amplifier 27, it converts the signal ACS to 8-bit digital data which is applied to D/A converter 37.

In D/A converter 37, when the signal from timer 35 is HIGH, the 8-bit digital data is converted to analog and is produced from the output Aout as the amplification control signal ACS'. Then, when the signal from timer 35 changes from HIGH to LOW, D/A converter 37 stops the D/A conversion and latches the binary data obtained at that moment from A/D converter 36, and it holds the data in an analog form and continues to produce the latched analog signal ACS' as long as the signal from timer 35 is maintained LOW.

Accordingly, when the output signal from timer 35 is HIGH, D/A converter 37 converts the digital signal from A/D converter 36 to an analog signal and outputs the converted analog signal as the amplification control signal ACS' to gain control amplifier 21. On the contrary, when the output signal from timer 35 becomes LOW, D/A converter 37 latches the digital signal from A/D converter 36 which is obtained immediately before the signal from timer 35 has changed to LOW level signal, and thereafter, D/A converter 37 produces an analog signal based on the latched digital signal as the amplification control signal ACS'.

It is noted that the embodiment shown in FIG. 2 employs a digital sample-hold circuit 37, but can be replaced with an analog sample-hold circuit using a capacitor. However, it is preferable to use the digital sample-hold circuit as shown, particularly when the holding time is long, because the held data in the digital sample-hold circuit can be maintained without any change, but with the analog sample-hold circuit, the held data may vary due to the discharge of the capacitor.

Figure 3A:
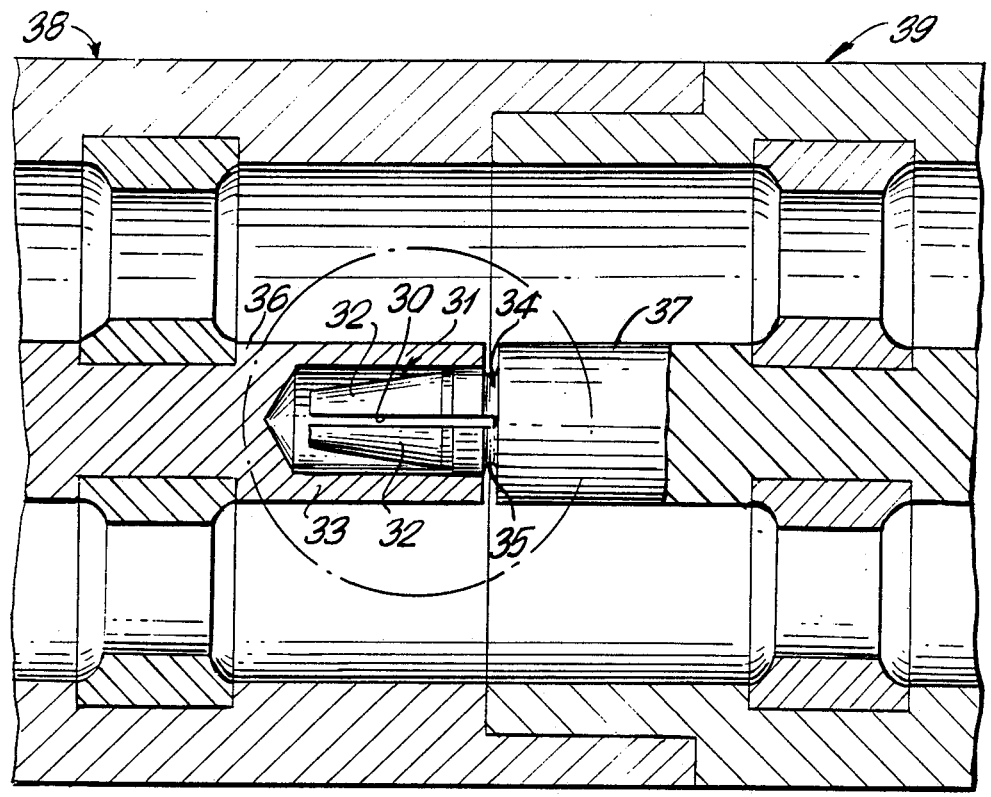
FIG. 3 is a graph showing waveforms of the signals at specific parts of the automatic gain control device of FIGS. 1 and 2, showing cases when unrecorded data areas and recorded data areas on the optical data storage medium are played back.
Figures 3B, 3C:
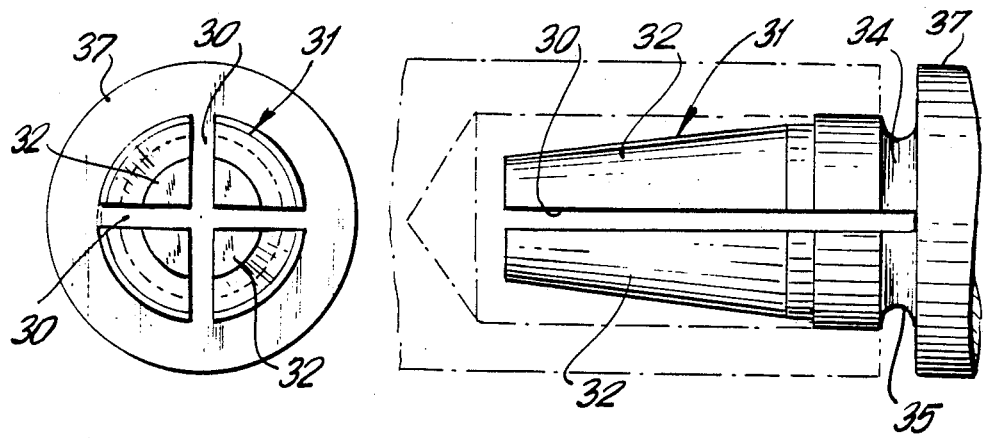
Figure 4:
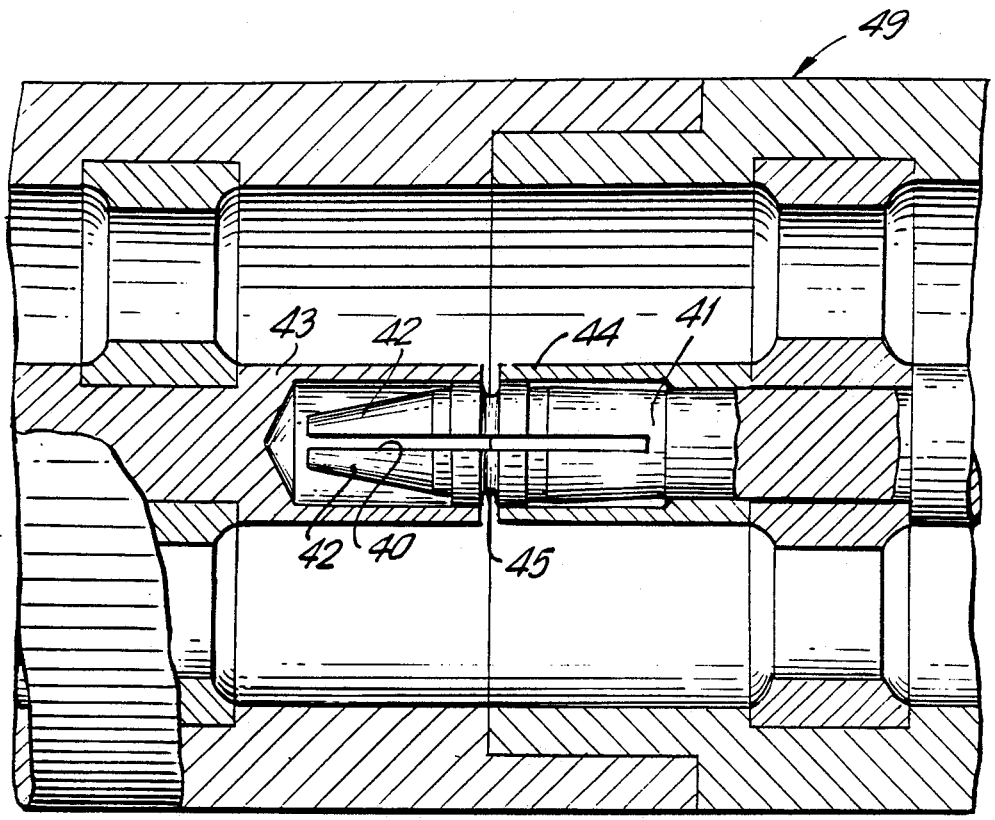
FIG. 4 is a block diagram of an automatic gain control device, according to the prior art.
Figure 5:
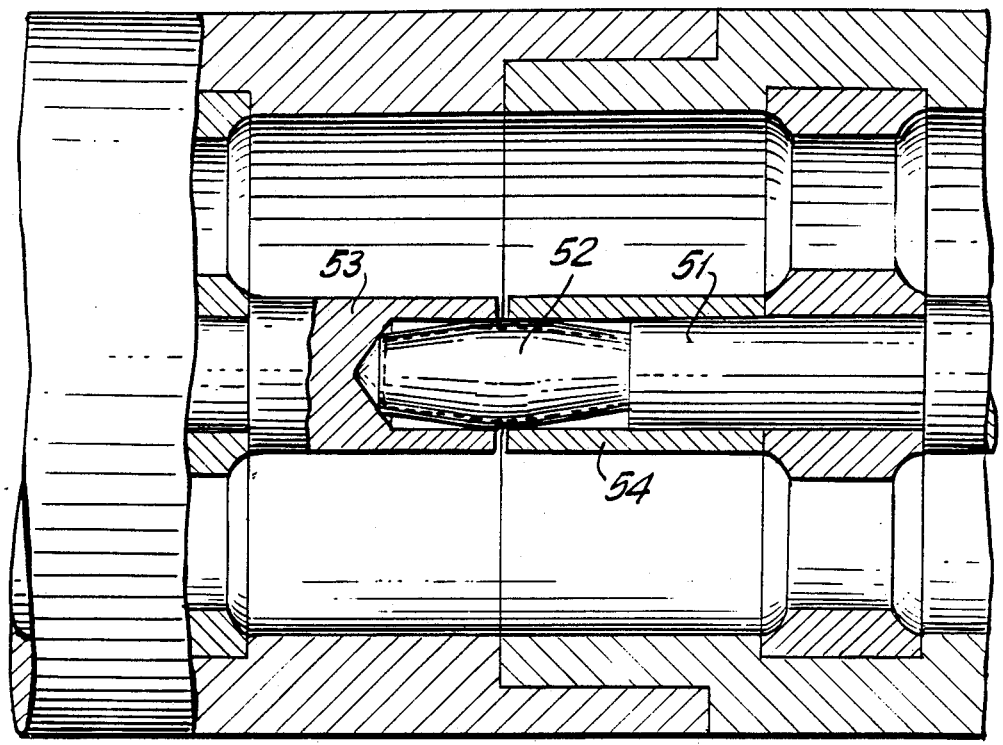
FIGS. 5 and 6 are graphs showing waveforms of the signals obtained at input and output of the automatic gain control device of FIG. 4.
Figure 6:
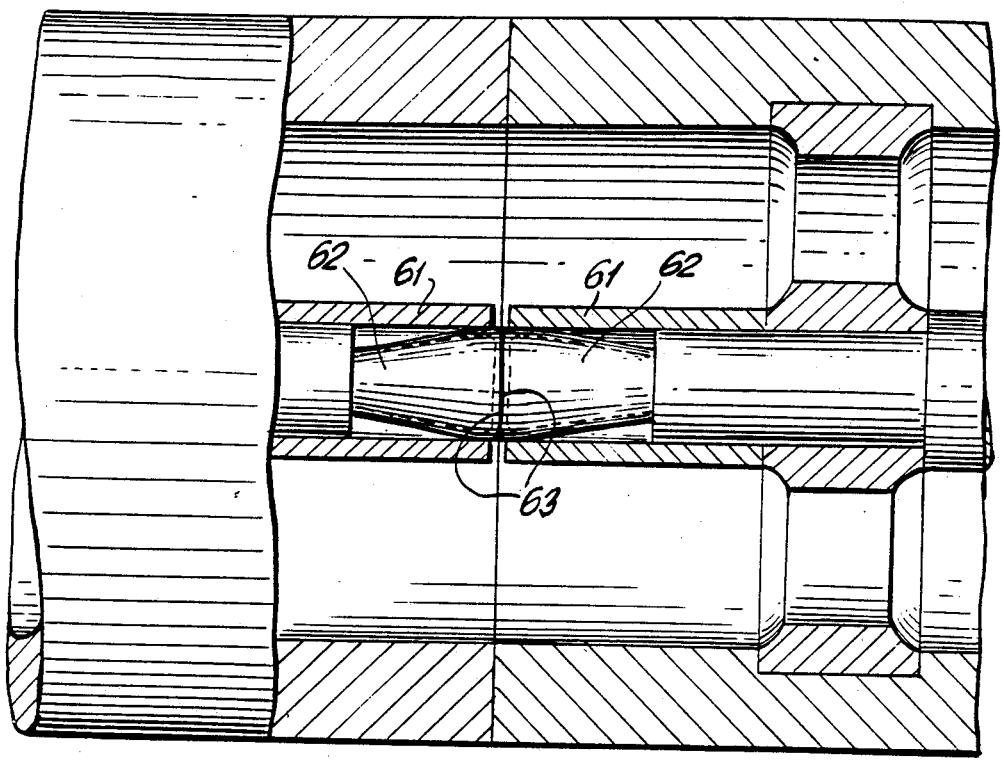
Figure 7:
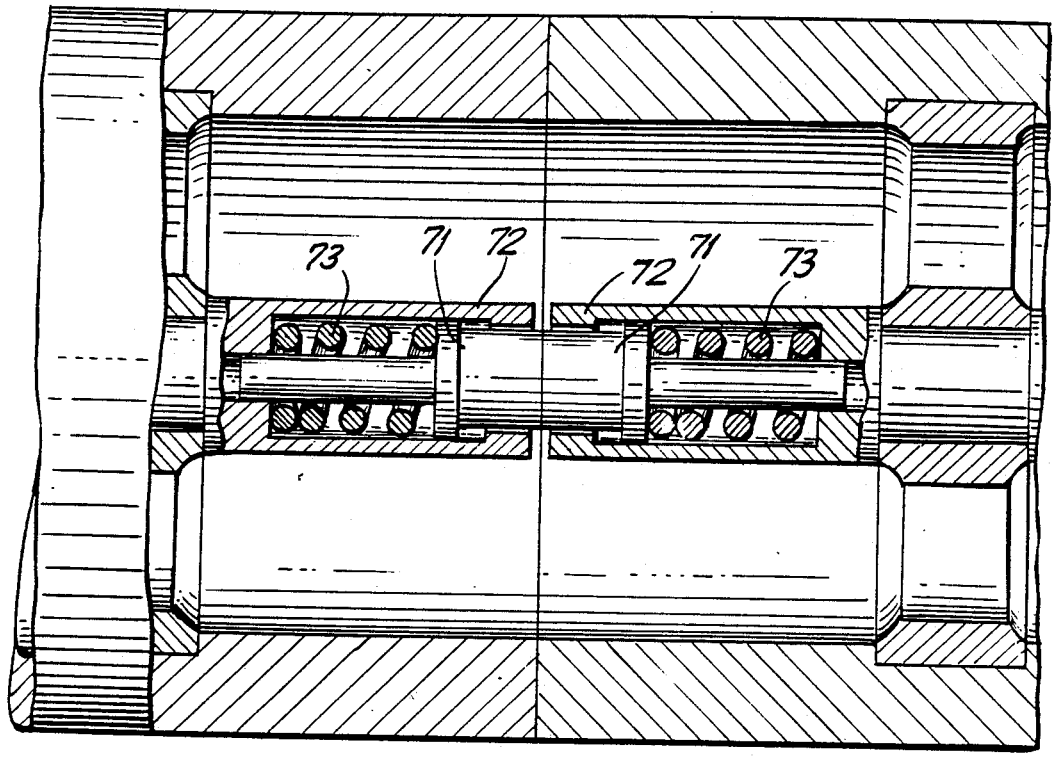
Figure 1:
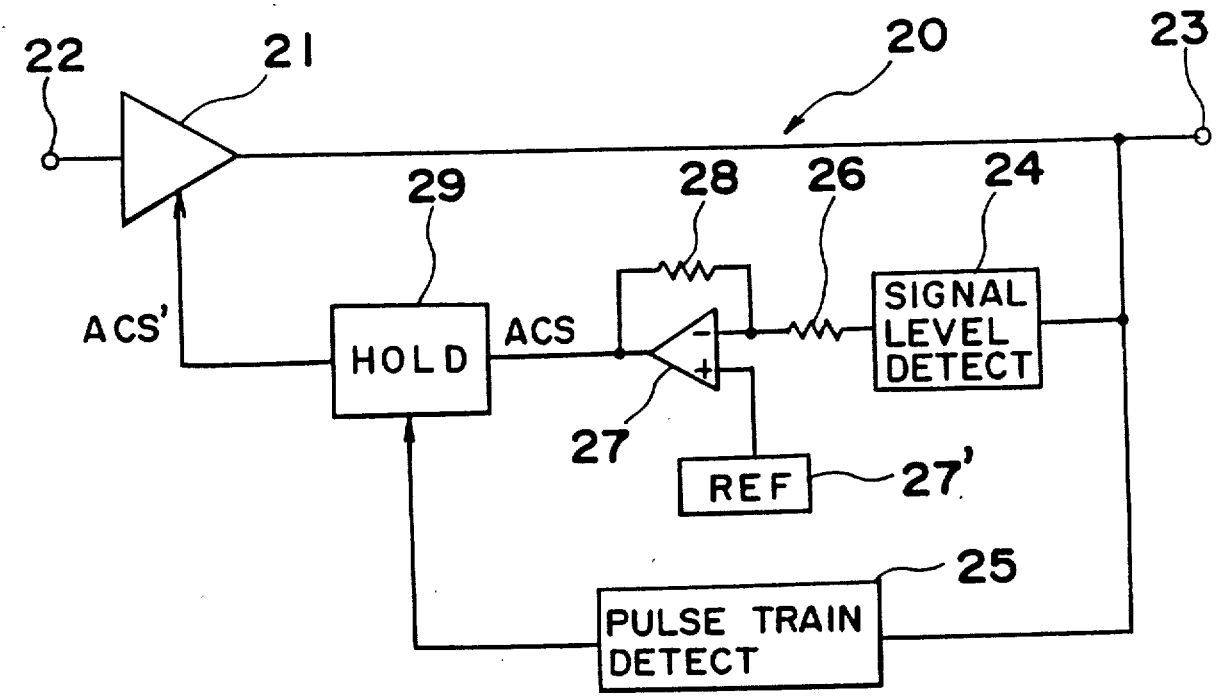
Figure 2:
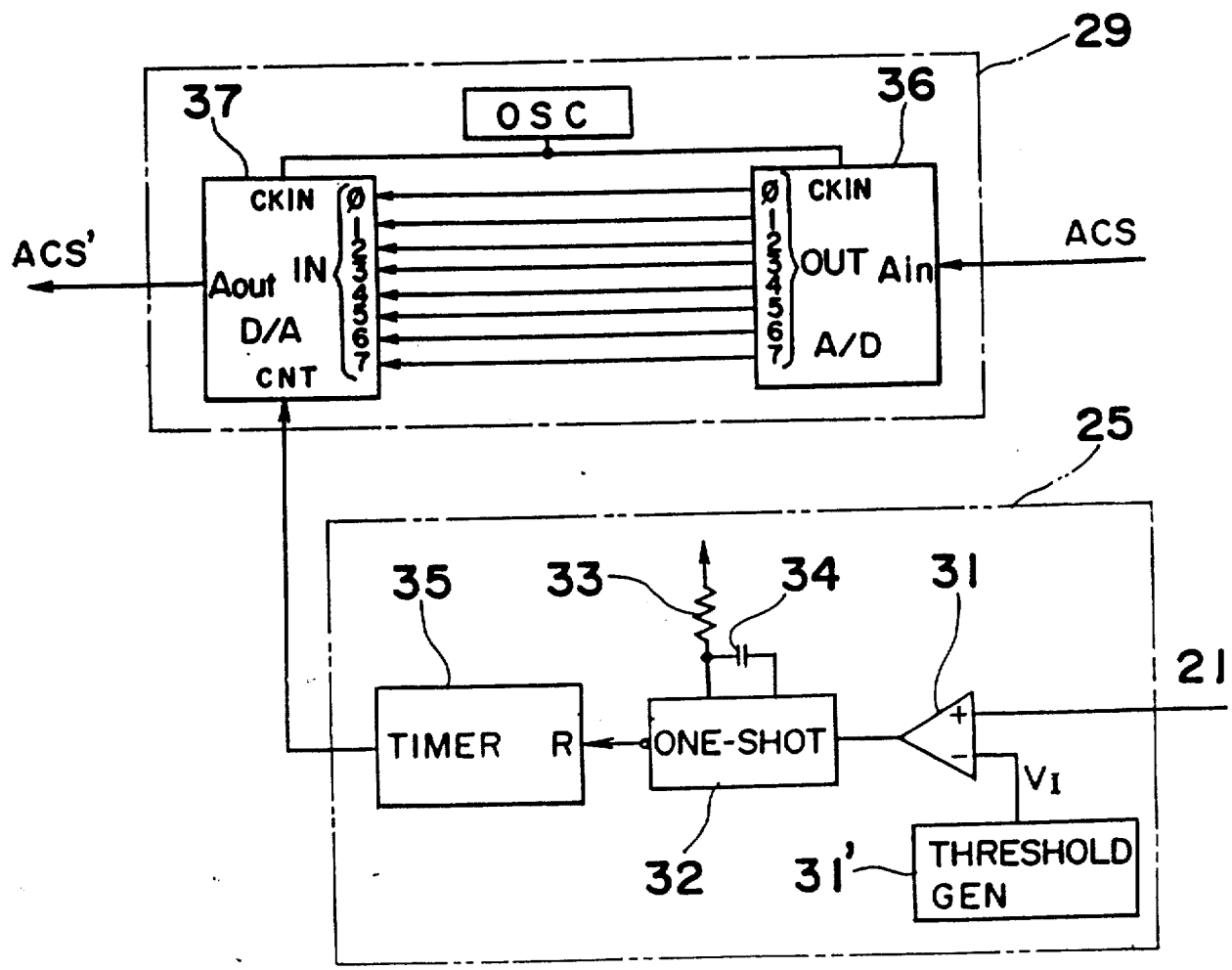
Figure 4:
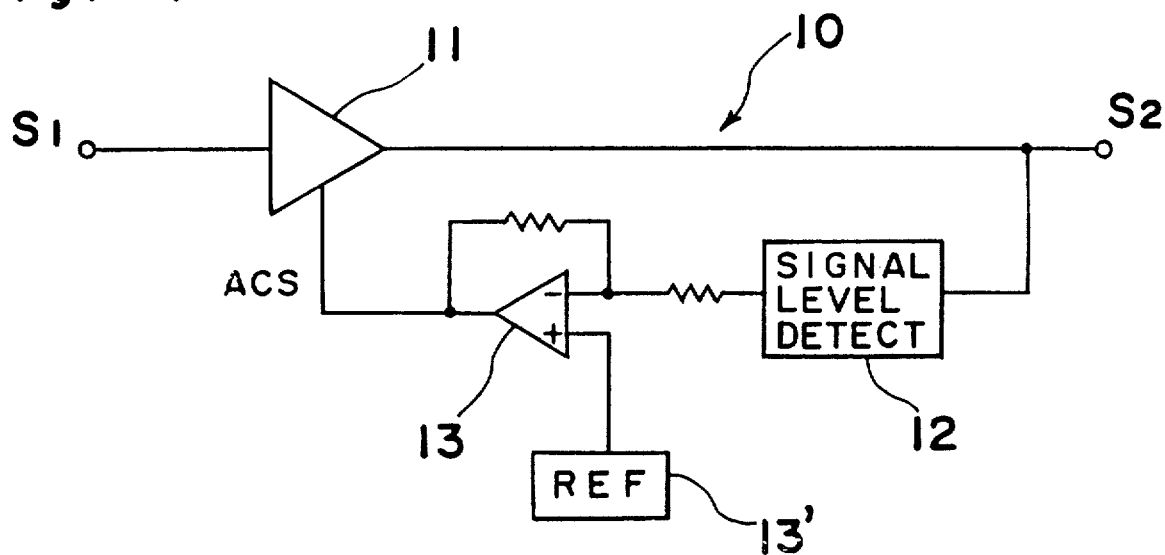
Figure 5:
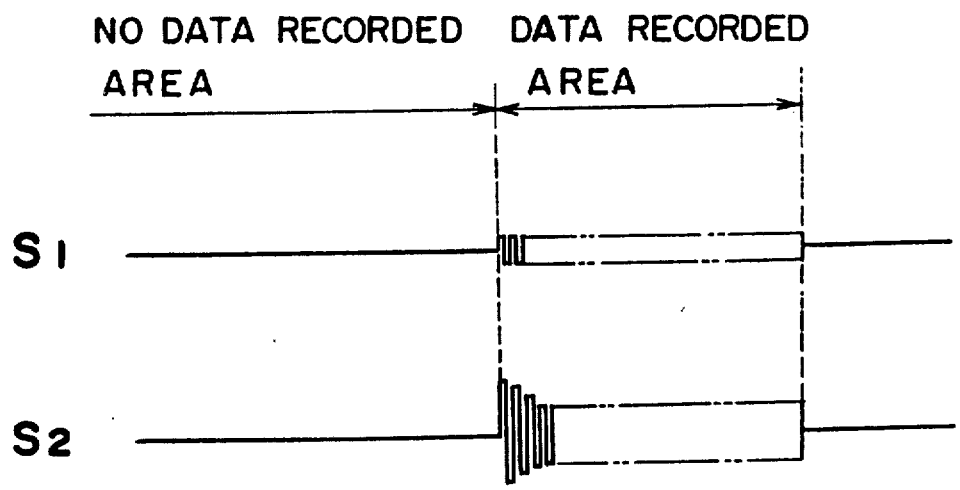
Figure 6:
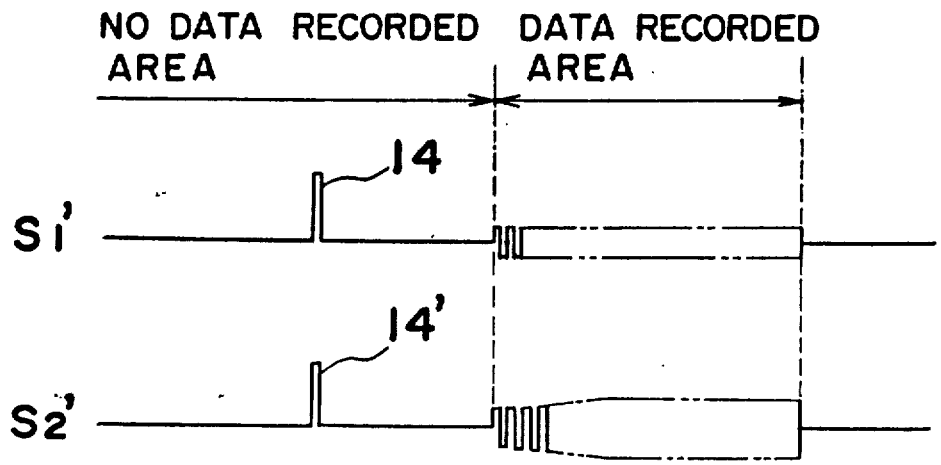

In operation, when an area to which data is not recorded on the optical data storage medium is played back, a playback signal containing no pulse, as shown by a real line in FIG. 3, first row, left half, is applied to gain control amplifier 21. In this case, gain control amplifier 21 produces a LOW level signal from output 23, as shown in FIG. 3, second row, left half.

In this case, since the output signal from gain control amplifier 21 is continuously LOW, comparator 31 continuously produces a LOW level signal. Thus, one-shot multivibrator 32 continues to produce a HIGH level signal, and thus, timer 35 is maintained to produce a LOW level signal.

In this case, D/A converter 37 produces the amplification control signal ACS' based on the latched digital signal which has been latched from A/D converter 36 immediately before the output signal from timer 35 has changed from a HIGH to LOW level signal in the previous operation. In other words, hold circuit 29 generates the amplification control signal ACS' based on the signal ACS obtained from operational amplifier 27 at the end of the detection of the previous pulse train, that is, the amplification control signal ACS latched in response to the signal from pulse train detection circuit 25 when the previous area having recorded data on recorded on the optical data storage medium was replayed.

Thus, the amplification of gain control amplifier 21 is maintained constant, resulting in that even if automatic gain control device 20 responds to the LOW playback signal which does not contain a pulse signal, the amplification of gain control amplifier 21 does not become excessive.

Thereafter, when the playback position of the optical data storage medium is at an area having recorded data, comparator 31 produces a pulse train. Since the period T1 is selected to be greater than the pulse repetition interval of the playback pulse train, one-shot multivibrator 32 continuously produces a LOW level signal from its output during the presence of the pulse train from comparator 31. The leading edge of the LOW level signal from one-shot multivibrator 32 coincides with the leading edge of the first pulse of the pulse train from comparator 31, and the trailing edge of the same coincides with the termination of period T1 counted from the leading edge of the last pulse of the pulse train.

After counting period T2 from the leading edge of the LOW level signal form one-shot multivibrator 32, timer 35 produces a HIGH level signal which is applied to D/A converter 37. The HIGH level signal from timer 35 continues until the end of the LOW level signal from one-shot multivibrator 32. In other words, the output from timer 35 changes from HIGH to LOW in response to the trailing edge of the negative going pulse from one-shot multivibrator 32.

Before timer 35 produces the HIGH level signal, D/A converter 37 produces the amplification control signal ACS' based on the latched data obtained when the previous recorded area, at which data was recorded on the optical data storage medium, was replayed.

Then, when timer 35 produces the HIGH level signal, i.e., when period T2 passes after the playback position on the optical data storage medium moves to an area having recorded data, the digital signal sent from A/D converter 36 is sequentially converted to an analog signal by D/A converter 37 and the converted analog signal is produced as the amplification control signal ACS' for use in gain control amplifier 21. In other words, when timer 35 produces a HIGH level signal, D/A converter 37 outputs the amplification control signal ACS' based on the difference between the currently obtained output signal from gain control amplifier 21 and the reference signal level. Accordingly, the playback signal of the information recorded on the optical data storage medium is controlled at a constant level.

In this way, during the period T2 after the beginning of the pulse train, the amplification control signal ACS' based on the latched data obtained when the previous area at which data was recorded on the optical data storage medium was replayed is used. Thus, when the period T2 elapses, the amplification of gain control amplifier 21 rapidly reaches the optimum amplification, and the output signal level of gain control amplifier 21 does not rise significantly.

Furthermore, according to the present invention, the state in which the amplification control signal ACS' is fed back to gain control amplifier 21 continues until period T1 passes after the last pulse signal in the playback pulse train rises, but there is no problem in this case because time constant T1 of one-shot multivibrator 32 is sufficiently shorter when compared with the response time of gain control amplifier 21.

Additionally, a defect pulse 41 such as shown by the dotted line in FIG. 3, for example, may be generated in the playback signal of the optical data storage medium due to scratches on the surface or foreign material adhering to the surface of the optical data storage medium, but will not adversely affect the amplification problem of gain control amplifier 21 at the time when the area at which data is recorded on the optical data storage medium is replayed, as explained below.

The defect pulse 41 is inputted as the trigger signal to one-shot multivibrator 32 after it is amplified by gain control amplifier 21 and binary converted by comparator 31. Thus, one-shot multivibrator 32 outputs negative logic pulse 42 of time width T1.

However, because such a defect pulse 41 does not normally continue for longer than the predetermined time period T2, timer 35 does not produce a HIGH level signal, but continues to produce the LOW level signal. Thus, even if negative logic pulse 42 is inputted, hold circuit 29 continues to hold the amplification control signal ACS' based on the latched data. In other words, even if defect pulse 41 is generated, automatic gain control device 20 will not respond to this defect pulse 41, and thus the amplification of gain control amplifier 21 will not become excessively low.

Thus, in the above situation, because the output signal level of gain control amplifier 21 does not drop significantly, a normal playback signal can, naturally, be reliably obtained.

It is to be noted that according to the present invention, hold circuit 29 is inserted between operational amplifier 27 and gain control amplifier 21, but it may also be inserted between, for example, signal level detection circuit 24 and operational amplifier 27. According to this modification, a constant amplification control signal can be applied to gain control amplifier 21 by latching the signal produced from signal level detection circuit 24.

Furthermore, one-shot multivibrator 32 is not restricted to a pulse generator for generating a pulse having a pulse width determined by the time constant T1 defined by resistor 33 and capacitor 34, but may, for example, be a one-shot pulse generator comprised from a counter circuit and a clock signal source.

In addition, hold circuit 29 is not restricted to means comprising A/D converter 36 and D/A converter 37, but means comprising, for example, a voltage/frequency converter and a frequency/voltage converter, or an analog sample holding circuit may also be used.

Moreover, if comparator 31 in pulse train detection circuit 25 is, for example, used in common with the comparator which is connected to automatic gain control device 20 and provided in a processing circuit which digitally processes the signal played back from the optical data storage medium, manufacturing costs can be reduced.

Therefore, in an automatic gain control device for optical memory devices according to the present invention, the significant variations in the playback signal level caused by the influences of scratches or areas of unrecorded data on the optical data storage medium can be reliably prevented.

Moreover, because the wasted recording areas are not necessary, any reductions in recording density, or the reduction of recording or playback speed will not be realized.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

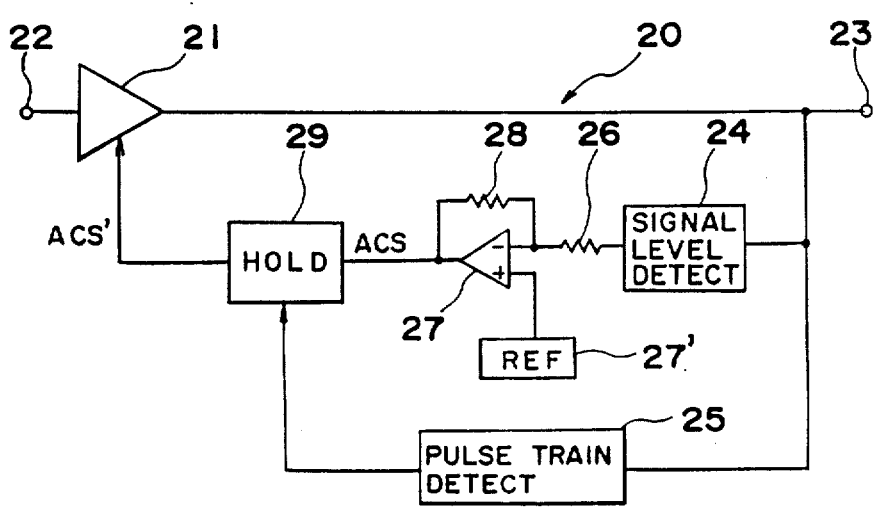

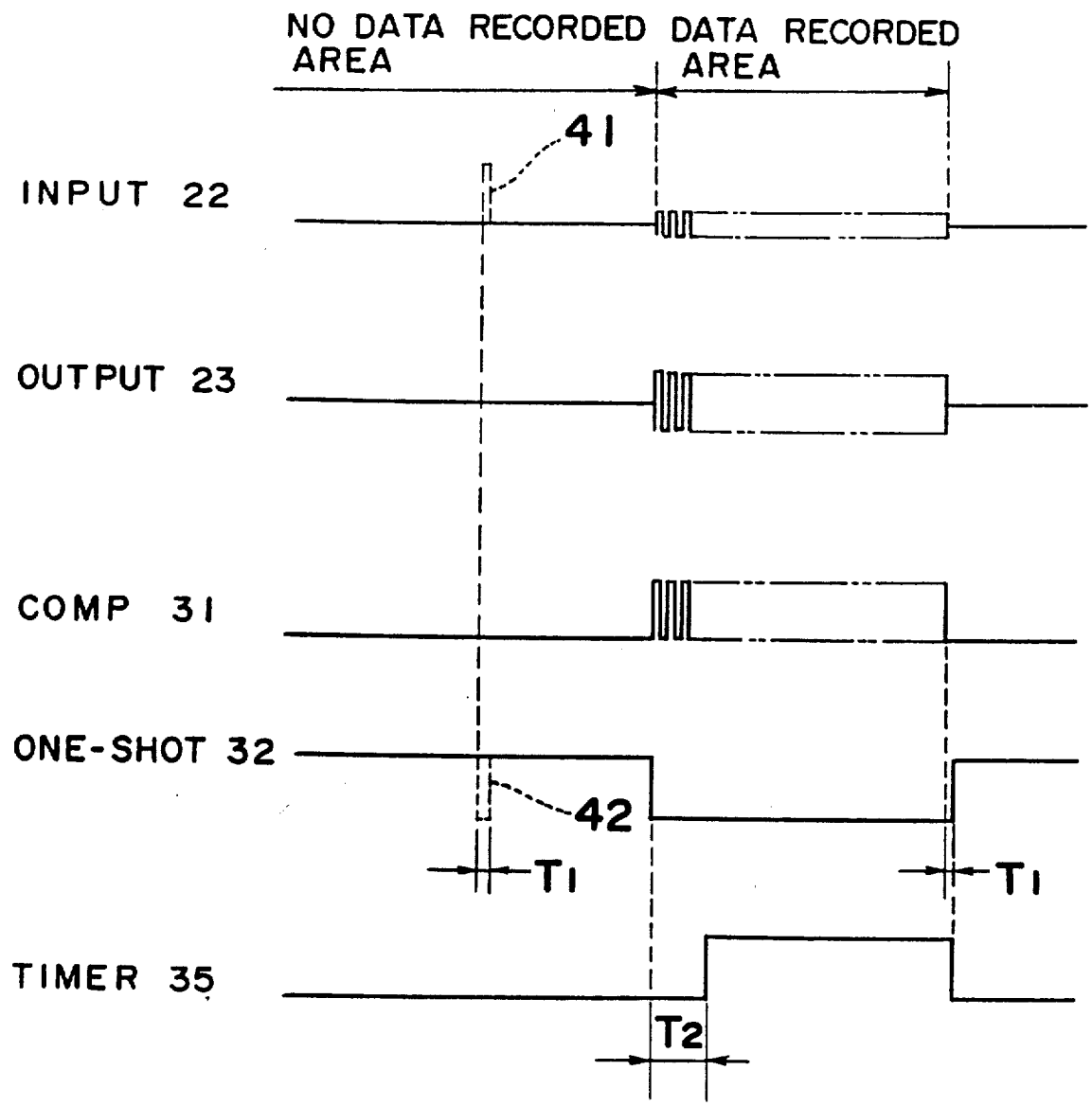

What is claimed is:

1. An automatic gain control device comprising:
    gain control amplifier means for producing an amplified signal, amplification being based on an amplification control signal;
    preparatory means, operatively connected to said gain control amplifier means, for producing a preparatory amplification control signal based on an output signal obtained from said gain control amplifier means;

data detection means, operatively connected to said gain control amplifier means, for detecting a presence of any data in said amplified signal from said gain control amplifier means and for producing a data present signal; and sample-hold means, operatively connected to said preparatory means, for producing said preparatory amplification control signal as said amplification control signal during a presence of said data present signal, for holding said preparatory amplification control signal at an end of said data present signal, and for producing the held preparatory amplification control signal as said amplification control signal during an absence of said data present signal.

2. An automatic gain control device comprising:

gain control amplifier means for producing an amplified signal, amplification being based on an amplification control signal;

preparatory means for, operatively connected to said gain control amplifier means, producing a preparatory amplification control signal based on an output signal obtained from said gain control amplifier means;

data detection means, operatively connected to said gain control amplifier means, for detecting a presence of any data in said amplified signal from said gain control amplifier means and for producing a data present signal during said presence of said data;

timer means, operatively connected to said data detection means, for counting a predetermined time and for producing a revised data present signal starting after a delay of said predetermined time from a beginning of said data present signal and ending at an end of said data present signal; and sample-hold means, operatively connected to said preparatory means, for producing said preparatory amplification control signal as said amplification control signal during a presence of said revised data present signal from said timer means, for holding said preparatory amplification control signal at an end of said revised data present signal, and for producing the held preparatory amplification control signal as said amplification control signal during an absence of said revised data present signal.

3. An automatic gain control device for use in an optical memory device comprising:

gain control amplifier means for producing an amplified playback signal, amplification being based on an amplification control signal;

a reference signal generator;

amplifier means for producing a preparatory amplification control signal based on a difference in a level between output signals from said gain control amplifier means and said reference signal generator;

pulse train detection means for detecting in said amplified playback signal a pulse train which continues longer than a predetermined time and for producing a pulse train detection signal starting after counting said predetermined time from a detection of a first pulse in said pulse train and ending after a detection of a last pulse in said pulse train; and hold means for holding said preparatory amplification control signal at an end of said pulse train detection signal and for providing an amplification control signal to said gain control amplifier means such that during an absence of said pulse train detection signal, said preparatory amplification control signal held in said hold means is used as said amplification control signal, and during a presence of said pulse train detection signal, a current preparatory amplification control signal from said amplifier means is used as said amplification control signal.

4. The automatic gain control device as claimed in claim 3, wherein said pulse train detection means comprises:

comparator means for comparing said amplified playback signal with a predetermined threshold level for producing a pulse train;

one-shot multivibrator means for generating a pulse train detection signal during a presence of said pulse train; and timer means for counting said predetermined time and for generating said pulse train detection signal starting after counting said predetermined time from a leading edge of said pulse train detection signal and ending in response to a trailing edge of said pulse train detection signal.

5. The automatic gain control device as claimed in claim 3, wherein said hold means comprises:

an analog to digital converter for converting said preparatory amplification control signal to digital; and a digital to analog converter for converting the digital preparatory amplification control signal to analog.

6. A method for automatically gain controlling an amplified signal, comprising the steps of:

(a) producing an amplified signal from a gain control amplifier;

(b) controlling an amplification of the gain control amplifier based on an amplification control signal;

(c) producing a preparatory amplification control signal based on an output signal obtained from the gain control amplifier;

(d) detecting a presence of any data in the amplified signal from the gain control amplifier;

(e) producing a data present signal when the presence of data is determined in said step (d);

(f) producing the preparatory amplification control signal as the amplification control signal when the data present signal is produced in said step (e);

(g) holding the preparatory amplification control signal at an end of the data present signal; and (h) producing the held preparatory amplification control signal as the amplification control signal when the data present signal is not produced in said step (e).

7. A method for automatically gain controlling an amplified signal, comprising the steps of:

(a) producing an amplified signal from a gain control amplifier;

(b) controlling an amplification of the gain control amplifier based on an amplification control signal;

(c) producing a preparatory amplification control signal based on an output signal obtained from the gain control amplifier;

(d) detecting a presence of any data in the amplified signal from the gain control amplifier;

(e) producing a data present signal when the presence of data is determined in said step (d);

(f) counting a predetermined time;

(g) producing a revised data present signal starting after a delay equal to the predetermined time at a beginning of the data present signal and ending at an end of the data present signal;

(h) producing the preparatory amplification control signal as the amplification control signal when the revised data present signal is produced in said step (g);

(i) holding the preparatory amplification control signal at an end of the revised data present signal; and (j) producing the held preparatory amplification control signal as the amplification control signal when the revised data present signal is not produced in said step (g).

8. A method for automatically gain controlling an amplified signal used in an optical memory device comprising the steps of:

(a) producing an amplified playback signal from a gain control amplifier;

(b) controlling an amplification of the gain control amplifier based on an amplification control signal;

(c) generating a reference signal;

(d) producing a preparatory amplification control signal based on a difference in a level between output signals of the gain control amplifier and the reference signal;

(e) detecting a pulse train in the amplified playback signal which continues longer than a predetermined time;

(f) producing a pulse train detection signal starting after counting the predetermined time from a detection of a first pulse in the pulse train in said step (e) and ending after a detection of a last pulse in the pulse train in said step (e);

(f) holding the preparatory amplification control signal at an end of the pulse train detection signal;

(g) providing the held preparatory amplification control signal as the amplification control signal to the gain control amplifier during an absence of the pulse train detection signal; and (h) providing a current preparatory amplification control signal as the amplification control signal to the gain control amplifier during a presence of the pulse train detection signal.

9. The method as claimed in claim 8, further comprising the steps of:

(i) comparing the amplified playback signal with a predetermined threshold level; and (j) producing a pulse train in response to the comparison executed in said step (i).

10. The method as claimed in claim 8, further comprising the steps of:

(i) converting the preparatory amplification control signal to a digital signal; and (j) converting the digital preparatory amplification control signal to an analog signal.

* * * * *

UNITED STATES PATENT AND TRADEMARK OFFICE
CERTIFICATE OF CORRECTION

PATENT NO. : 4,910,479

DATED : March 20, 1990

INVENTOR(S) : Hiroshi Fuji, et al.

Page 1 of 5

It is certified that error appears in the above-identified patent and that said Letters Patent is hereby corrected as shown below:

The title page should be deleted to appear as per attached title page.

Sheets 1 of 6 through 6 of 6 of the Drawings consisting of Figures 1-7 should be deleted to appear as per attached sheets.

Signed and Sealed this

Tenth Day of December, 1991

*Attest:*

HARRY F. MANBECK, JR.

*Attesting Officer*     *Commissioner of Patents and Trademarks*

United States Patent [19]
Fuji et al.

[11] Patent Number: 4,910,479
[45] Date of Patent: Mar. 20, 1990

[54] AUTOMATIC GAIN CONTROL DEVICE FOR USE IN AN OPTICAL MEMORY DEVICE

[75] Inventors: Hiroshi Fuji, Nara; Shigemi Maeda, Yamatokoriyama; Takeshi Yamaguchi, Nara; Kunio Kojima, Nara; Toshihisa Deguchi, Nara; Shigeo Terashima, Tenri, all of Japan

[73] Assignee: Sharp Kabushiki Kaisha, Osaka, Japan

[21] Appl. No.: 299,013

[22] Filed: Jan. 19, 1989

[30] Foreign Application Priority Data
Jan. 22, 1988 [JP] Japan .................................. 63-13195

[51] Int. Cl.⁴ ............................................. H03G 3/10
[52] U.S. Cl. ...................................... 330/279; 330/281
[58] Field of Search ................... 307/264, 353, 359; 330/129, 141, 279, 280, 281, 285

[56] References Cited
U.S. PATENT DOCUMENTS
3,770,984 11/1973 Connor et al. .................. 330/141 X
4,292,598 9/1981 Yasumura ......................... 330/281

FOREIGN PATENT DOCUMENTS
60-253066 6/1986 Japan .
61-137286 11/1986 Japan .
61-158079 12/1986 Japan .
61-233473 3/1987 Japan .

Primary Examiner—Steven Mottola
Attorney, Agent, or Firm—Birch, Stewart, Kolasch & Birch

[57] ABSTRACT

An automatic gain control device for use in an optical memory device has a circuit for producing an amplification control signal which is fed back to a gain control amplifier through a sample-hold circuit. A pulse train detection circuit is provided for detecting the pulse train indicating that the data stored are a on the optical memory device is being playedback. When the pulse train is detected, the sample-hold circuit is made inactive so that the amplification control signal is directly fed back to the gain control amplifier, and when the pulse train ends, the sample-hold circuit is made active to hold the amplification control signal obtained at the end of the pulse train and to produce the amplification control signal held in the sample-hold circuit.

10 Claims, 3 Drawing Sheets